UNITED STATES PATENT OFFICE.

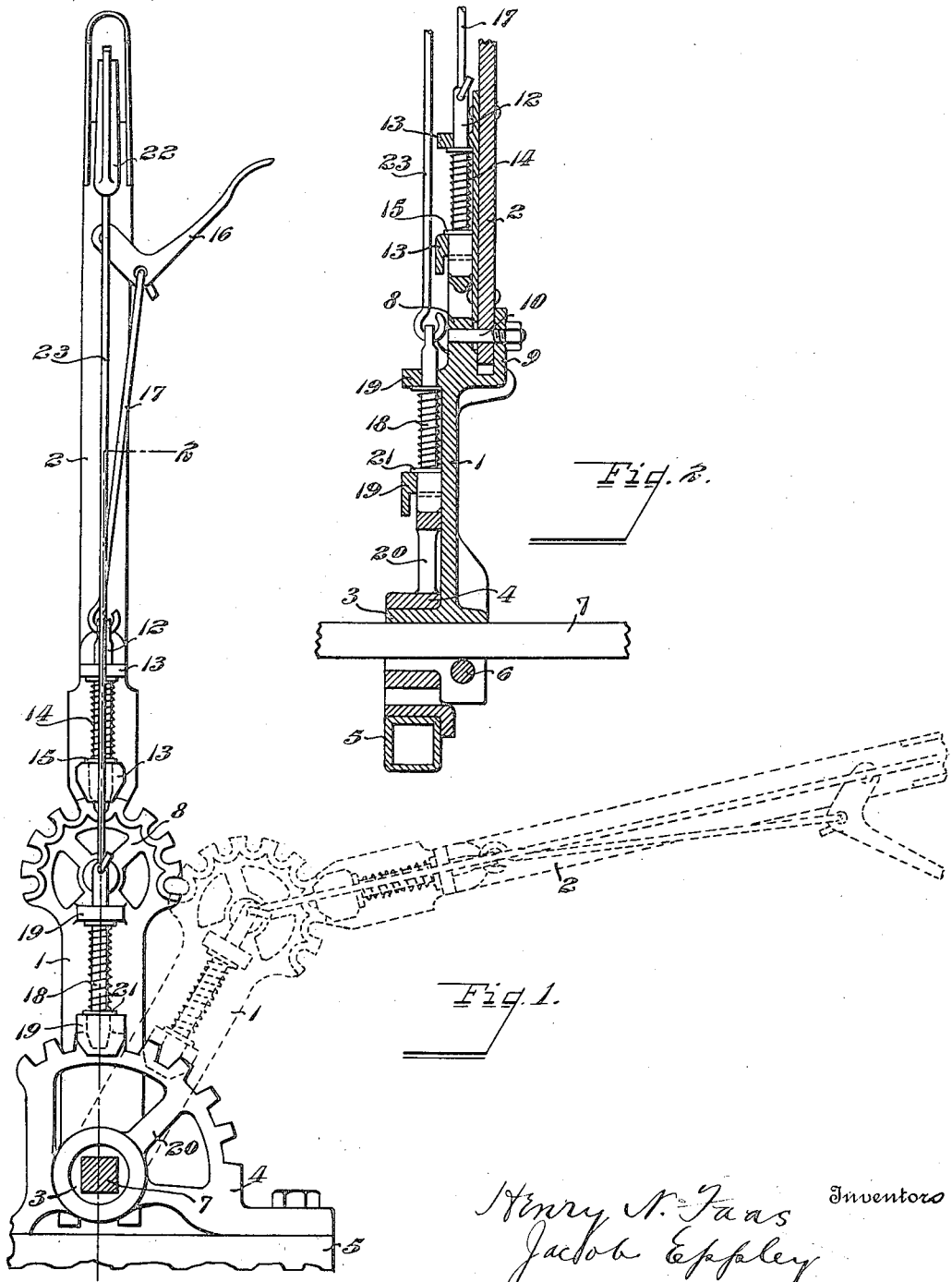

HENRY N. FAAS AND JACOB EPPLEY, OF SPRINGFIELD, OHIO, ASSIGNORS TO THE AMERICAN SEEDING MACHINE COMPANY, OF SPRINGFIELD, OHIO, A CORPORATION OF OHIO.

FOLDABLE LEVER.

1,168,382.   Specification of Letters Patent.   Patented Jan. 18, 1916.

Application filed June 11, 1912. Serial No. 702,969.

*To all whom it may concern:*

Be it known that we, HENRY N. FAAS and JACOB EPPLEY, citizens of the United States, residing at Springfield, in the county of Clark and State of Ohio, have invented certain new and useful Improvements in Foldable Levers, of which the following is a specification.

This invention relates to improvements in foldable levers more particularly adapted for use in connection with agricultural machinery; the present lever being especially designed for use with seeding machinery, fertilizer drills, and the like.

An object of the invention is to provide a folding lever which will be simple in construction and effective in operation.

A further object of the invention is to provide for folding the foldable part of the lever in either direction from the normal longitudinal axis of the lever.

A further object of the invention is to provide for various desirable positions of operation of the foldable part of the lever on either side of the normal longitudinal axis of the lever so that the operator may obtain an upward lifting strain or a downward pressure strain on the lever so as to make its manipulation more easy, and also be able to bring it in convenient reach when sitting on the seat.

In the accompanying drawings, Figure 1 is a side elevation of a device embodying our improvements, one of the positions of the lever being shown in dotted lines. Fig. 2 is a section on the line 2—2 of Fig. 1.

Like parts are represented by similar characters of reference in the several views.

In the said drawings, 1 and 2 represent respectively the parts of the lever, 2 being the foldable part. The part 1 of the lever has a laterally extending trunnion 3, which is journaled in a bracket 4 secured to the frame 5 of the machine in connection with which the lever is used. The lower end of the lever part 1 is bifurcated and this bifurcated end is clamped by a bolt 6 to a shaft 7, which shaft, in the present case, may be the ordinary shaft of a fertilizer distributing machine or seeding machine to which the lifting and presser arms for the furrow opening devices are connected.

The member 1 has at its upper end a toothed segment 8, and between this toothed segment and an offset ear 9, formed on said member 1, is pivoted the foldable member 2 through the medium of a bolt 10. The respective members 1 and 2 are held in different positions of adjustment with respect to each other by a locking bolt or dog 12 arranged in suitable guides 13 on the foldable member 2 and normally spring-pressed into engagement with the notches of the segment 8 by a spring 14 interposed between the upper guide 13 and a collar 15 fast to the dog; a lever 16 pivoted to the upper end of the member 2 and connected to the dog by a link 17 serving to withdraw the dog from the notches when it is desired to change the adjustment of the lever parts.

The lever as a whole is held in its different positions of operation by a bolt or dog 18 arranged in suitable guides 19 on the lever part 1 and normally spring-pressed into engagement with the notches of a toothed segment 20 formed on the bracket 4, which spring is interposed between the upper guide 19 and a collar 21 fast to the bolt 18; the bolt being adapted to be withdrawn from the notches by a lever 22 pivotally connected to the upper end of the member 2 and connected to the bolt 18 by a rod 23.

Having thus described our invention, we claim:

1. In a device of the character described, a lever formed of two members, a main pivoted member and an auxiliary member pivotally connected to the free end of the main member and adapted to form a continuation of the same, means independent of the auxiliary lever for holding said main member in different positions of operation, and means for holding said auxiliary member in different positions of adjustment with respect to the main member on either side of the longitudinal center thereof.

2. In a device of the character described, a lever formed of two members, a main pivoted member and an auxiliary member pivotally connected to the free end of said main member and adapted to form a continuation of the same, means independent of the auxiliary lever for holding said main member in different positions of operation, a fixed toothed segment on one of said members, and a spring-pressed dog on the other of said members for holding said auxiliary member in different positions of adjustment with respect to said main member on either side of the longitudinal center thereof.

3. In a device of the character described, a lever formed of two members, a main pivoted member and an auxiliary member pivotally connected to the free end of the main member and arranged to form a continuation of the same, means independent of the auxiliary lever for holding said main member in different positions of operation, a toothed segment at the free end of said main member, and a spring-pressed dog on said auxiliary member coöperating with said toothed segment to hold said auxiliary member in different positions of adjustment on either side of the longitudinal center of said main member.

4. In a device of the character described, a lever formed of two members, a main member pivoted to a fixed part and an auxiliary member pivotally connected to the free end of said main member adapted to form a continuation of the same, a toothed segment on said fixed part, and a spring-pressed dog on said main member coöperating with said segment to hold said main member in different positions of adjustment, a toothed segment arranged on said main member, and a spring-pressed dog on said auxiliary member to hold said auxiliary member in different positions of adjustment on either side of the longitudinal center of said main member, and means arranged at the free end of said auxiliary member and connected with said spring-pressed dogs for releasing said dogs from said segments.

In testimony whereof, we have hereunto set our hands this 7th day of June 1912.

HENRY N. FAAS.
JACOB EPPLEY.

Witnesses:
CHAS. I. WELCH,
ESTHER E. PFEIFER.